United States Patent [19]

Shanks

[11] 4,414,565
[45] Nov. 8, 1983

[54] METHOD AND APPARATUS FOR PRODUCING THREE DIMENSIONAL DISPLAYS

[75] Inventor: Ian A. Shanks, Malvern, England

[73] Assignee: The Secretary of State for Defence in Her Britannic Majesty's Government of the United Kingdom of Great Britain and Northern Ireland, London, England

[21] Appl. No.: 276,338

[22] PCT Filed: Oct. 15, 1980

[86] PCT No.: PCT/GB80/00167
§ 371 Date: Jun. 11, 1981
§ 102(e) Date: Jun. 11, 1981

[87] PCT Pub. No.: WO81/01201
PCT Pub. Date: Apr. 30, 1981

[30] Foreign Application Priority Data

Oct. 16, 1979 [GB] United Kingdom ............... 7935861
Feb. 27, 1980 [GB] United Kingdom ............... 8006627

[51] Int. Cl.³ .......................... H04N 9/54; H04N 5/72
[52] U.S. Cl. ...................................... 358/89; 350/144; 352/86; 353/10; 358/231; 358/250

[58] Field of Search ................. 358/89, 250, 901, 231, 358/236; 353/7, 10; 350/144, 420; 352/86

[56] References Cited

U.S. PATENT DOCUMENTS

| | | | |
|---|---|---|---|
| 2,542,789 | 2/1951 | Ames, Jr. ............................. | 358/89 |
| 2,884,833 | 5/1959 | Pohl ..................................... | 358/89 |
| 2,975,671 | 3/1961 | Hemstreet ........................... | 350/420 |
| 3,723,651 | 3/1973 | Gorog .................................. | 358/236 |
| 4,140,370 | 2/1979 | Snaper et al. ....................... | 352/86 |
| 4,173,391 | 11/1979 | Schure et al. ....................... | 353/7 |

*Primary Examiner*—Joseph A. Orsino, Jr.
*Attorney, Agent, or Firm*—Cushman, Darby & Cushman

[57] ABSTRACT

An apparent three dimensional image is produced from a two dimensional image by causing the two dimensional image to appear on a saddle shaped surface. This saddle shaped surface may be a real surface such as a light scattering glass or a surface in space formed by an optical component such as an aspheric lens or lenticular array. The two dimensional image may be produced by a cathode ray tube e.g. a television receiver, a slide or film projector, or a non-emissive display such as a liquid crystal display.

14 Claims, 13 Drawing Figures

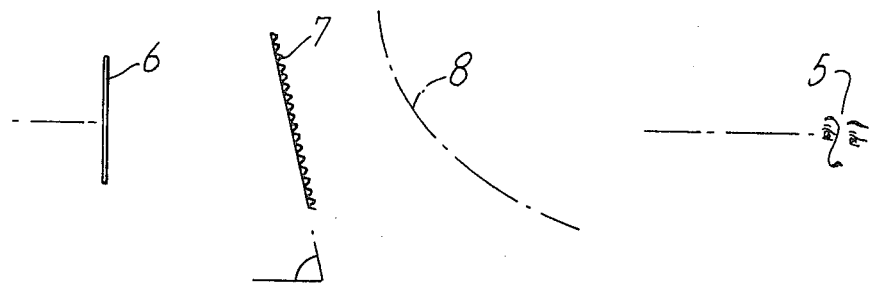
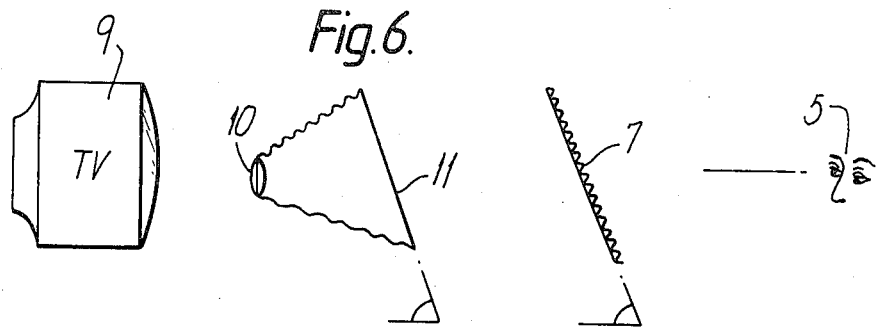
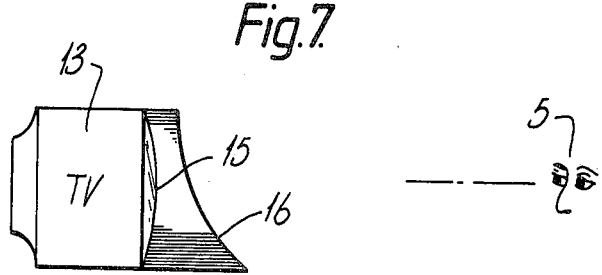

METHOD AND APPARATUS FOR PRODUCING THREE DIMENSIONAL DISPLAYS

This invention relates to a method and apparatus for producing three dimensional displays.

There have been many schemes for producing stereoscopic or three dimensional (3-D) displays. For example the projection of two images with orthogonal polarisation or different colours and viewing by an operator wearing polarised or coloured spectacles. One such scheme, described in UK Patent Spec No. 1523436 displays two slightly different images frame sequentially on a single cathode ray tube, eg a television receiver, in conjunction with polarising spectacles and a liquid crystal polarisation switch. Both the above schemes are suitable for moving displays eg a football match.

While these methods allow the pictures to be viewed simultaneously from a wide range of angles or by a number of observers, they have the disadvantage of requiring the observers to wear polarising or coloured spectacles. Other schemes have used slotted or lenticular screens to separate a number of different pictures into different spatial zones so that the unaided eyes of an observer see different stereoscopically related pictures. These have the disadvantage that there are viewing positions where the left eye sees a view intended for the right eye and vice versa so that the perspective is inverted in the 3-D presentation and a most undesirable pseudoscopic presentation is perceived. This can severely limit the number of suitable viewing positions if only one left eye view and one right eye view are presented. All of these methods require the presentation of at least two disparate views to the observer and this can give problems such as reduced resolution, flicker, increased usage of photographic materials, or increased television video bandwidth.

Another method, giving a pseudo 3-D presentation uses only one view of the scene. This single view is imaged as a virtual, upright, magnified image in a concave spherical mirror or in a plane mirror. This effect appears to be due, in part at least, to the framing effect of the mirror on the observed image and, in part, to the spherical aberration of the curved mirror if used.

For displays having only one observer, there are many 3-D systems involving the simultaneous viewing of two slightly different views through eye pieces.

The present invention provides a single image and exploits various cues that an observer uses to distinguish distances. For close objects in an actual scene binocular disparity allows stereoscopic perception but at larger distances this binocular disparity is negligible and other effects such as parallax, obscuration and perspective, are predominant.

According to this invention a method of producing an apparent three dimensional display includes producing an image of a scene with varying differential magnification within the display whereby at least part of the observed image appears as a real or virtual image of the scene on a substantially saddle shaped surface or part thereof.

A saddle shaped surface is a surface that is convex in horizontal section and straight or concave in vertical section as seen by an observer; it may be part of the surface of a solid of revolution such as a bell, alternatively the radii of curvature may vary in magnitude from point to point.

In one form, the method includes the steps of producing a distorted plane image of the scene and causing observation of the distorted image on a saddle shaped surface, or part thereof, or through a lens thereof, so that the observed image frame has similar proportions to that of the original scene or the undistorted image of the original scene.

One effect of producing an image on a saddle shaped surface is to vary the magnification in different parts of the observed scene. Another effect is to vary the distance of different parts of the image from the eyes of an observer and thus to induce an acceptable binocular disparity. These and other effects, concerned with the saddle shaped image, allow the observer to lose his perception of the picture as flat and allow the other pictorial depth cues to predominate to give a realistic 3-D presentation of the scene.

According to this invention, apparatus for displaying an apparent three dimensional image comprises means for displaying an image with varying differential magnification at different parts of the image whereby the image appears to an observer to lie on a saddle shaped surface or part thereof.

The saddle shaped surface may be a light scattering surface of saddle shape or a real or virtual saddle shaped surface formed in space by a fibre-optic plate, a curved prism, a lenticular array, or an aspheric lens e.g. a Fresnel lens.

The means for displaying the image may include a cathode ray tube or other electronically controlled display e.g. plasma panel, a liquid crystal whose display is distorted on its screen or by a lens or curved prism for observation on the saddle shaped surface or part thereof.

Alternatively the means for displaying the image may include a projector of a display such as a photograph, a film transparency or cine film strip.

The cathode ray tube or other electronically controlled display may be part of a domestic TV receiver, computer terminal, radar set or other video receiver or part of a thermal imager system such as a pyroelectric vidicon system or cooled detector and mechanical scanning system.

The invention will now be described, by way of example only, with reference to the accompanying drawings of which:

FIG. 1 shows the projection of an image onto a curved surface;

FIG. 2a, b, c respectively show in outline a normal transparency of a scene, a distorted image, and an observed image relating to FIG. 1;

FIG. 5 shows the display of a distorted photograph using a Fresnel lens;

FIG. 6 shows the display of a standard television picture;

FIG. 7 shows the display of a distorted television picture observed through a fibre-optics faceplate;

Figure 1:
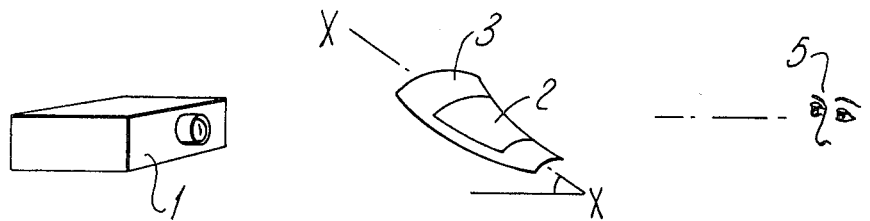
Figure 8:
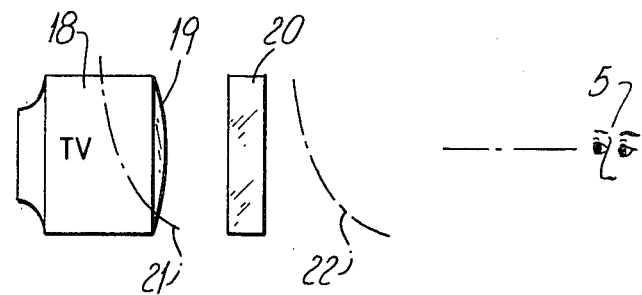
Figure 9:
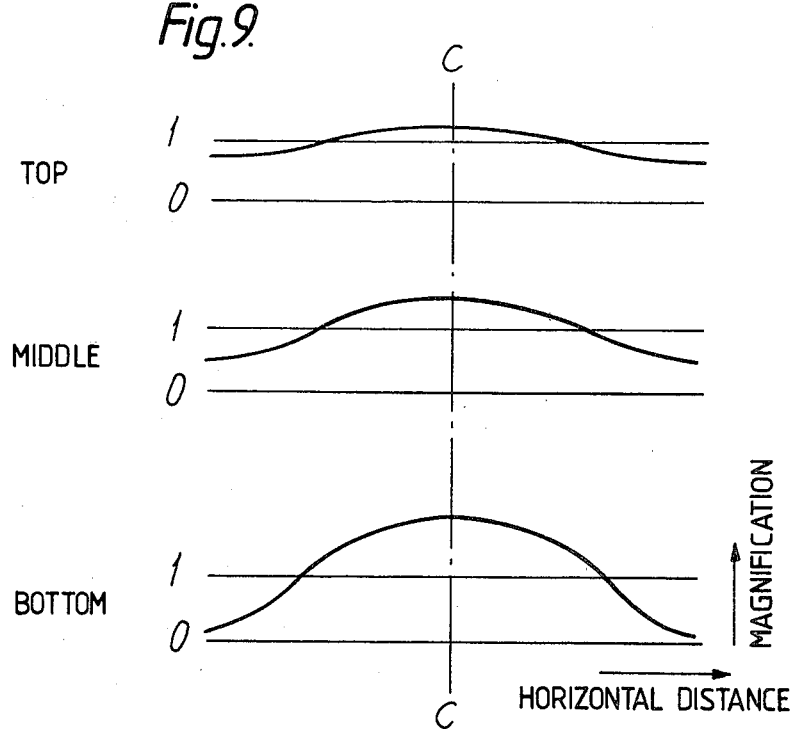
Figure 10A:
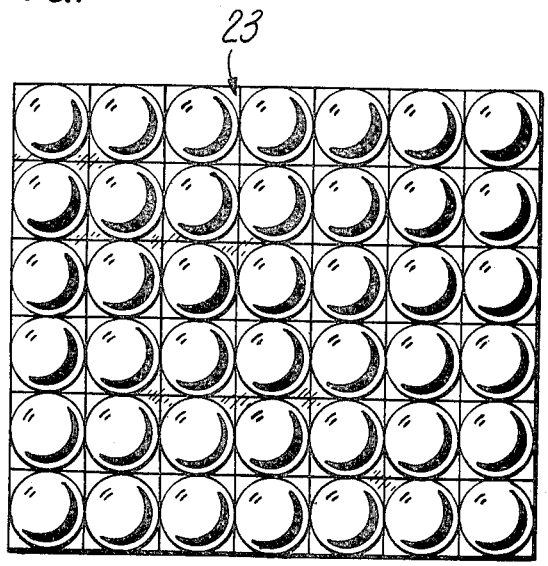
Figure 10B:
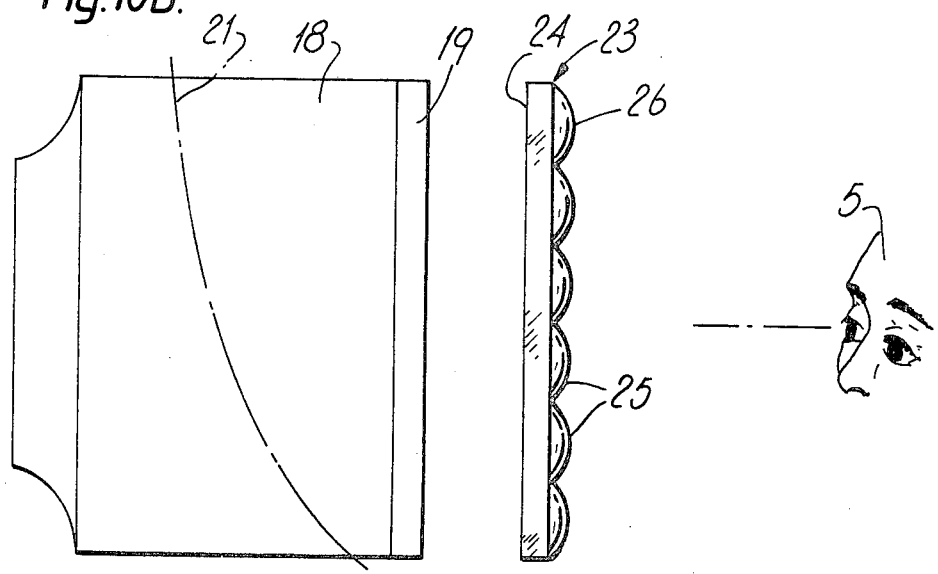

FIG. 8 shows the display of a distorted television picture observed through an aspheric lens or curved prism to produce a virtual image behind the television screen, FIG. 9 shows how the magnification varies with horizontal distance along three different parts of the observed image seen in FIG. 1; and FIGS. 10a, b show front and sectional views of an optical component for use in the display of FIG. 8.

Figure 2A:
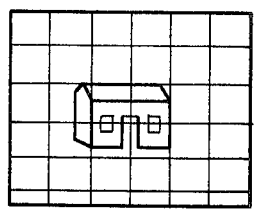
Figure 2B:
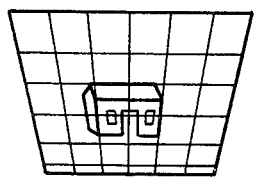
Figure 2C:
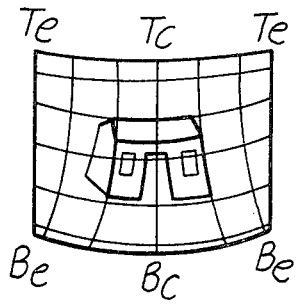

As seen in FIG. 1 a slide projector projects an image on to a curved saddle shaped surface 3 of glass roughened to provide a light scattering surface. The view observed has apparent three dimensional characteristics shown in outline in FIG. 2c. The orginal view, or slide of the view, is shown in FIG. 2a and requires distorting by decreasing the magnification at the bottom of the view (relative to the top) as indicated in FIG. 2b. This may be achieved by exposing a true view, FIG. 2a, onto an inclined sheet of photographic paper (eg at 5°) which is then processed and copied to provide the transparency of FIG. 2b. The proportions of the frames of FIGS. 2a and 2c are arranged to be similar or, ideally, FIG. 2c may be slightly wider at the bottom than at the top.

The shape of the curved surface is explained by reference to FIGS. 3, 4. A bell shape has an axis of symmetry xx with a smaller radius $r_1$, at one end and a larger radius $r_2$ at the other end. Between $r_1$ and $r_2$ the radius $r_3$ increases nonlinearly so that the surface at the line 1 of intersection with a plane containing xx is concave. The curved surface of FIG. 1 is a part of the bell shaped of FIG. 3 ie it is saddle shaped. In one example the bell shaped surface was as shown in outline in FIG. 4 and the projector, curved surface 3 and observer arranged in a straight line with the axis xx inclined 30° to this straight line. The distance between surface 3 and observer was greater than one meter.

The line 1 of FIG. 3b is marked to show the bell radius at the top centre $T_c$, top edge $T_e$, bottom centre $B_c$ and bottom edge $B_e$ of the image. This lettering is also marked on FIG. 2c. The image on the surface 3 was, at the top 49 mm wide, at the bottom 54 mm wide, height at the sides (ie Te to Be) 35 mm, and height at the centre (ie $T_c$ to $B_c$) 53 mm, all dimensions being chord dimensions.

Figure 3:
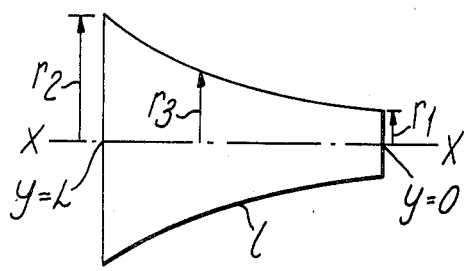
FIG. 3 shows a side view of a bell shape of which the curved surface in FIG. 1 is a part.
Figure 4:
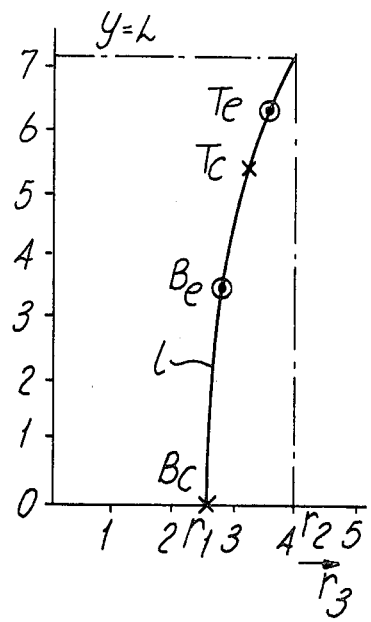
FIG. 4 is a graph showing variations of the bell radius with distance from one end.

The saddle shape of FIG. 3 may take other forms. For example instead of being circular in cross section it may be ellipsoidal. The magnitude of the radius of curvature of 1 may be a constant or a variable. Also the curve 1 may approximate to a straight line or change its sense of curvature over a portion of its length.

In operation, an observer 5 sees an immage on the light scattering curved surface that is similar in frame outline to that of the original scene. However, because of the various distortions as projected and on the curved surface, the image depth and magnification varies within the frame outline in a manner which an observer interprets as a three dimensional image using the pictorial depth cues which now predominate.

The approximate variation of observed (on surface 3) image magnification with horizontal distance is shown schematically in FIG. 9 for three different horizontal sections, the top, middle and bottom. The vertical scale is magnification, the centre axis CC is the vertical centre of the oberved image. It is shown that the magnification is greater than unity at the centre (CC axis) and falls below unity at the image edges. Also the area of each curve above and below the unity line is about equal although this may not always be true eg if the image width is greater at the bottom than the top.

FIG. 5 shows the display of a photograph 6 through a Fresnel lens 7 to an observer 5. The photograph 6 is a distorted one as for FIG. 2b and the Fresnel lens has its grooves towards the observer and is tilted about a horizontal axis as shown so that its image is formed in space (as indicated in broken lines 8) on a surface similar to the actual surface 3 in FIG. 1. Thus the observer 5 sees an image of the photograph in three dimensions.

Details of the Fresnel lens was as follows: focal length 8 inches, diameter 10 inches, obtainable from Ealing Beck Ltd. 15 Greycaine Road Watford WD2 4PW, catalogue No. 24-0077.

The photograph dimensions were at the top 24 cm wide, at the bottom 21 cm, height 15.7 cm. Distance from the upright photograph 6 to lens 7 (inclined at 75° to the horizontal) was 64 cm and the distance from the centre of the lens 7 to the observer was greater than 1 meter.

FIG. 6 shows a standard television (TV) 9 whose picture is focussed by a lens 10 onto a ground glass screen 11 arranged at an angle to the TV screen so that a distorted image of the TV picture (as in FIG. 2b) is formed on the screen 12. A Fresnel lens 7 is arranged between the ground glass screen 11 and an observer 5 at an angle to the ground glass screen. The Fresnel lens 7 is similar to that of FIG. 5. In one example the Fresnel lens 7 was arranged about 38 cm from the ground glass screen; the observer was over 1 meter from the centre of Fresnel lens 7; the ground glass screen 11 was at an angle of 20° to the vertical; the Fresnel lens 7 was at an angle of 23° to the vertical; the image (inverted) on the screen 11 was 12.5 cm at the top (botton of scene), 14 cm at the bottom and 10 cm high.

In an alternative arrangement the lens and ground glass screen are not used. Instead, the scan circuits in the TV 9 are arranged to provide a distorted image similar to FIG. 2c on its flat screen. A similar electronic scan variation may be used with a CRT having a curved faceplate and phosphor layer which is ideally part of a saddle or bell shaped surface.

Alternatively, as FIG. 7, a TV receiver 13 has fibre optic faceplate 16 mounted adjacent to the flat TV screen 15. The fibre optic faceplate 16 has a front surface composed of square ended fibres of fibres whose ends have been treated to scatter light, arranged in a saddle shape so that an observer sees a real image on a saddle shaped surface.

FIG. 8 shows a TV receiver 18 having a front screen 19 on which a distorted image is displayed. An aspheric optical component 20, eg a Fresnel lens, is arranged in front of the screen 19 to cause a virtual image to be seen by an observer 5 lying on a saddle shaped surface 21 behind the component 20 to cause a real image to be seen by observer 5 lying on a saddle shaped surface 22 in front of the component 20.

As previously noted the saddle shaped surface is ideally concave in vertical section. However, an acceptable shape may have a straight line for its whole or part of the vertical section. This shape produces an apparent 3-D effect but is not quite so marked as for the ideal saddle shape.

The 3-D effect image may be in colour or monochrome and may be viewed from a range of angles and by several observers simultaneously.

FIGS. 10a, b show a lenticular array 23 for use as the optical component 20 in FIG. 8. The array 23 comprises a sheet having a flat or slightly curved rear face 24 and a multitude of lens surfaces 25 on the opposing front face 26. Each lens 25 has a pre-determined focal length which depends on the curvature of the lens front surface.

The array 23 is mounted in front of the television screen 19 where a two dimension image is formed in the usual manner. This two dimensional image may be considered as an array of image points or pixels at a known depth behind the lenticular array. Each lens 25 in the lenticular array 23 forms an image of each pixel at a pre-determined distance from the lens dependent on its focal length. Collectively the lenticular array 23 forms an image on a saddle shaped surface 21 which appears to an observer 5 as a three-dimensional image.

The lenticular array 23 may be produced by casting replicas from a master plate produced by known photogravure techniques. The array 23 of FIG. 11 is shown with only a few lenses; in practice each lens is very small. With a large number, e.g. $10^6$, of lenses each lens is too small to be resolved by the eye at normal viewing distance.

The two dimensional image on the screen 19 may be predistorted by varying the relative magnification at the bottom of the screen. The lenticular array 23 may be parallel or at a non zero angle to the screen.

In another arrangement the scan circuits in the TV 9 are arranged to produce a distorted image on its flat screen such that the differential magnification within the image appears similar to that on a real saddle shaped surface.

The cathode ray tube (TV receiver) and photographs may be replaced by non-emissive displays such as liquid crystal displays (L.C.D.). Such L.C.D. are known devices and comprise a thin layer of liquid crystal material contained between glass plates carrying electrode structures for selectively applying voltages across selected areas of the layer.

I claim:

1. Apparatus for displaying an apparent three dimensional image comprising:
   (i) display means for providing a distorted two dimensional image of an original scene, the distorted image having a greater magnification at its top than at its bottom;
   (ii) means for displaying this distorted image on a real or virtual saddle shaped surface inclined with its bottom part closer to an observer than its top part, the saddle shaped surface being convex in a horizontal plane with a smaller radius at the bottom than the top and straight or concave in a vertical plane.

2. Apparatus according to claim 1 wherein the display means is a cathode ray tube the line sweep of which is distorted to vary the magnification of the two dimensional image.

3. Apparatus according to claim 1 wherein the display means is a lens and a light scattering surface inclined at a non-zero angle to the display.

4. Apparatus according to claim 1 wherein said display means includes a lenticular array mounted in front of the display means for causing the two dimensional image to appear as an image in space where the image points are perceived to lie on a saddle shaped surface with the bottom of the image nearer an observer then the top.

5. Apparatus according to claim 1 wherein the display means is an aspheric lens.

6. Apparatus according to claim 5 wherein the aspheric lens is a Fresnel lens.

7. Apparatus according to claim 1 wherein the display is a non-emissive display means.

8. Appartus according to claim 7 wherein the display is a liquid crystal display.

9. Apparatus according to claim 1 wherein the display means is a light emitting display.

10. Apparatus according to claim 9 wherein the light emitting display is a cathode ray tube.

11. Apparatus according to claim 9 wherein the light emitting display is a projector and screen.

12. Apparatus according to claim 1 wherein said display means includes a light emitting display, means for varying the magnification at the bottom of the two dimensional image relative to its top, and said displaying means includes a saddle shaped light scattering surface, onto which the variably magnified two dimensional image is projected.

13. Apparatus according to claim 12 wherein the saddle shaped surface is formed on the surface of a shaped plate of transparent material.

14. Apparatus according to claim 12 wherein the saddle shaped surface is formed by one end surface of a fibre optic bundle whose other end surface is adjacent the light emitting display.

* * * * *